A. W. RUSSEL.
VEHICLE AXLE.
APPLICATION FILED JULY 13, 1917.
1,272,858.
Patented July 16, 1918.
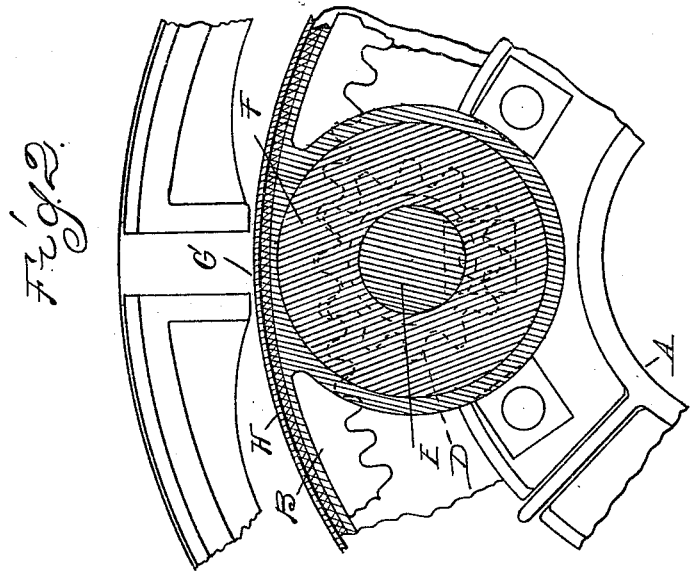
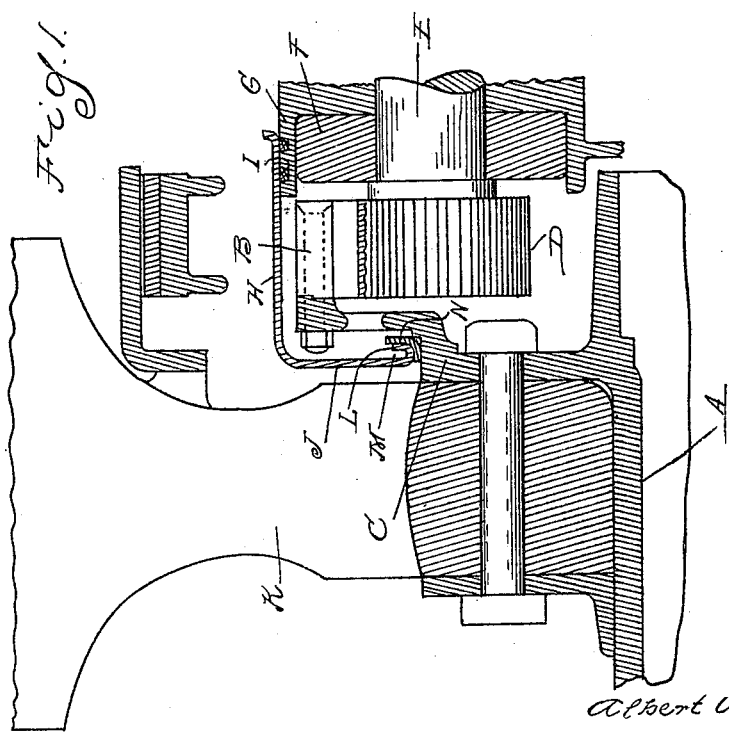
Inventor
Albert W. Russel
By Whittemore Hulbert & Whittemore
Attorneys

UNITED STATES PATENT OFFICE.

ALBERT W. RUSSEL, OF DETROIT, MICHIGAN, ASSIGNOR TO RUSSEL MOTOR AXLE COMPANY, OF DETROIT, MICHIGAN, A CORPORATION OF MICHIGAN.

VEHICLE-AXLE.

1,272,858.

Specification of Letters Patent.

Patented July 16, 1918.

Application filed July 13, 1917. Serial No. 180,269.

*To all whom it may concern:*

Be it known that I, ARTHUR W. RUSSEL, a citizen of the United States of America, residing at Detroit, in the county of Wayne and State of Michigan, have invented certain new and useful Improvements in Vehicle-Axles, of which the following is a specification, reference being had therein to the accompanying drawings.

The invention relates to vehicle axles of that type in which the wheels are provided with internal ring-gears in mesh with pinions on a driving crank-shaft. It is the object of the present invention to provide a housing for the ring-gear and pinion which is easily applied and which will form a substantially oil-tight joint.

In the drawings:

Figure 1 is a sectional side elevation of the gear housing for my axle;

Fig. 2 is a transverse section therethrough.

A is the wheel hub, B is the ring-gear secured to the flange C of said hub, D is the pinion in mesh with said ring-gear and mounted upon the jack-shaft E, and F is a stationary circular head on the inner side of said ring-gear and pinion and through which the jack-shaft is passed.

In housing the gear, it is difficult to provide a joint between the revolving and nonrevolving parts which will prevent the leakage of oil or lubricant. I have therefore devised a construction which will successfully accomplish this purpose and also one which permits of easily engaging and removing the housing. As shown, G is a cylindrical peripheral portion of the stationary head F, H is the housing having a portion forming a pressed engagement with the portion G, which latter, if desired, may be grooved at I to receive packing for rendering the joint oil proof. The casing H is provided with an integral inwardly-extending flange J arranged between the ring-gear and the spokes K of the wheel and extending in proximity to the peripheral portion of the flange C. Inasmuch as the flange C is rotating and the housing J is stationary, it is difficult or impossible to form the joint directly therebetween which will prevent the oil from running out. This is for the reason that the oil will be thrown out centrifugally from the rotating parts upon the inner face of the housing H and will then drain downward from the portion of this housing along the flange J until it reaches the joint through which it is likely to leak. I have avoided such a defect by forming the flange J with a reversely-bent inwardly-extending flange L, leaving between the same and the outer portion an annular groove M. This will cause the oil draining down the flange J to flow around the groove M to the lower side of the housing where it will then drop off of the flange L.

To further assist in retaining the oil from leakage through the joint the rotating member is provided with a flange N at one side of the flange L and preferably of slightly greater depth. This flange N serves to throw off the oil lodging thereon by centrifugal action and also to direct any oil in the joint between said flange and the flange L into the interior of the housing, for the reason that the joint between the flanges is in the plane of rotation. Consequently even where there is a considerable crevice between the flanges through which oil might easily flow, such an effect is prevented, for all of the oil flowing down the inner face of the casing will be deflected by the flange N through the groove M, while any oil dropping upon the joint between the flanges M and N will be thrown centrifugally to the interior of the case.

What I claim as my invention is:

1. In an axle, the combination with the wheel and ring-gear carried thereby, of a housing having a stationary head on the inner side of said gear provided with a peripheral cylindrical portion and a detachable housing section having a cylindrical portion forming a press fit on said cylindrical peripheral portion and provided with an inwardly-extending flange on the outer side of said ring-gear, said inwardly-extending flange provided with means for directing the drainage of the lubricant.

2. In an axle, the combination with the wheel and ring-gear mounted thereon, of a housing on the inner side of said ring-gear having a cylindrical peripheral portion with a groove therein, a detachable housing section having a cylindrical portion for pressing upon the first-mentioned cylindrical portion and provided with an inwardly-extending flange on the outer side of the ring-gear.

3. In an axle, the combination with the wheel and ring-gear carried thereby, of a housing for inclosing said ring-gear having an inwardly-extending flange, and a returnbent flange on the inner face of said inwardly extending flange forming an intermediate channel for directing the drainage of the lubricant.

4. In an axle, the combination with the wheel and ring-gear mounted thereon, of a housing for inclosing said ring-gear having an inwardly-extending flange with a returnbent portion at its inner end and on the inner face thereof, and a flange on the rotating wheel adjacent to said returnbent flange.

5. In an axle, the combination with a rotating wheel and ring-gear carried thereby, of a housing for said ring-gear having an inwardly-extending flange terminating in a returnbent portion, and a flange on the rotating part adjacent to said returnbent flange, said adjacent flanges providing grooves between the same and the members by which they are respectively carried for drainage of lubricant away from the joint.

6. In an axle, the combination with a wheel and a ring-gear carried thereby, of a housing for said ring-gear having an inwardly-extending flange, and coöperating members on said housing and on the rotating wheel lying adjacent to each other in the plane of rotation and respectively separated from the members carrying the same by annular grooves.

In testimony whereof I affix my signature.

ALBERT W. RUSSEL.

Copies of this patent may be obtained for five cents each, by addressing the "Commissioner of Patents, Washington, D. C."